United States Patent [19]

Turner

[11] Patent Number: 4,760,955

[45] Date of Patent: Aug. 2, 1988

[54] CONTROL SYSTEM FOR HEATING AND COOLING APPARATUS OF BUILDING

[76] Inventor: James H. Turner, 917 Guercus Ct., Sunnyvale, Calif. 94086

[21] Appl. No.: 78,948

[22] Filed: Jul. 29, 1987

[51] Int. Cl.⁴ .............................................. G05D 23/19
[52] U.S. Cl. ................................... 236/68 C; 251/11; 337/336; 337/370; 337/377
[58] Field of Search ................. 236/68 C, 68 B, 68 R, 236/49; 251/11; 337/335–338, 370, 371, 377; 219/511; 60/528

[56] References Cited

U.S. PATENT DOCUMENTS

| | | | |
|---|---|---|---|
| 2,348,143 | 5/1944 | Miller | 236/68 R X |
| 2,743,574 | 5/1956 | McCorkle | 236/68 R X |
| 2,748,223 | 5/1956 | Frank | 236/68 R X |
| 3,062,942 | 11/1962 | Finlay et al. | 219/511 X |
| 3,667,539 | 6/1972 | Sweger | 337/335 X |
| 4,184,633 | 1/1980 | Bata et al. | 236/68 R |
| 4,184,634 | 1/1980 | Betts et al. | 236/68 R X |
| 4,189,092 | 2/1980 | Maxson et al. | 236/49 X |

Primary Examiner—William E. Tapolcai
Attorney, Agent, or Firm—Townsend and Townsend

[57] ABSTRACT

An improved control system for controlling the heating and cooling of a building or home including an improved control device forming a component of the control system. The control device includes a lever which can pivot about a central axis intermediate the ends of the lever, each end of the lever having a bimetallic element adjacent to and above a resistance heating element. The outer end of the bimetallic element coupled to one end of the lever engages an adjustable stop. The other bimetallic element is in engagement with a resilient blade which, depending upon its operative position, controls the flow of a fluid through a tube, the fluid flow through the tube being a function of the operative condition of the adjacent bimetallic element. The fluid flow through the tube determines how a fluid-actuated controller is operated to control a valve which provides heating and cooling fluid for heating and cooling a space. The control system of the present invention can operate a normal fashion under the influence of a thermostat through one part of a day and can then operate under the influence of the control device during another part of the day, such as during the nighttime hours when heating and cooling requirements are at a minimum.

20 Claims, 3 Drawing Sheets

CONTROL SYSTEM FOR HEATING AND COOLING APPARATUS OF BUILDING

BACKGROUND OF THE INVENTION

1. Field of the Invention

This invention relates generally to improvement in control systems of the type used for operating the heating and cooling apparatus of a building or home and, more particularly, to an improved control system which provides greater control over the heating and cooling a space than has heretofore been possible with conventional equipment.

2. Description of the Prior Art

Many different types of control systems have been used with heating and cooling units of buildings and homes. Control units of conventional designs have been operated under the control of clocks, thermostatic switches, and other moving parts of many different designs. Typical control units are disclosed in U.S. Pat. Nos. 3,964,676, 3,983,928, 4,014,499 and 4,339,073.

Generally, the major drawback of the more preferred conventional control systems of the type described are because they are operated under the influence of a single thermostatic switch throughout an entire 24 hour day. While this type of operation is satisfactory in numerous applications, it is not necessarily efficient in certain situations over an entire day, where, for example, control of the system is not as efficient during the nighttime hours as it is in the daytime hours. Too many shifts in the operating cycle occur for instance, during the nighttime hours when the heating or cooling demand is relatively low. Thus, because of this drawback, a need exists for an improved control system to allow the system to operate in a first mode during one period of a day and in a second mode during another period of the day, so that energy is more efficiently expended in the operation of the heating or cooling apparatus under the influence of the control system.

SUMMARY OF THE PRESENT INVENTION

The present invention satisfies the aforesaid need by providing an improved control system which allows a heating or cooling apparatus to be used in a more efficient manner than has heretofore been possible, especially during periods which the heating or cooling demand during one part of a day or cycle is different from such demand during another part of a day or cycle. To this end, the control system of the present invention includes an improved control device for controlling the flow of fluid to a fluid actuated controller of a conventional control system having a thermostatic switch, whereby the control device can cause the system to operate in a different mode than it ordinarily would with only the conventional thermostatic switch for control purposes.

The control device of the present invention includes a pivotal lever having a pair of opposed ends, each end having a bimetallic element thereon. The control device further includes a source of heat, such as an electrical resistance heating element, adjacent to each bimetallic element, respectively. The heater elements are in a sufficient proximity to the respective bimetallic elements so that, when the heaters are energized, the respective elements are caused to change shape and thereby cause pivoting of the lever in a direction to open or close an orifice to control the volume rate of flow of fluid to the fluid-actuated controller of the control system. The heater elements are operated at different times so as to cause pivoting of the lever in different directions as a function of the operation of the heating elements themselves.

One bimetallic element on the lever is normally in engagement with an adjustable, fixed stop. The other bimetallic element engages a resilient blade adjacent to the outlet end of a tube which receives an actuating fluid under pressure from a fluid source. By actuating one or the other of the bimetallic elements on the lever, the position of the blade can be changed to thereby open or partially or fully close the outlet of the tube adjacent to the blade. For a greater opening, more fluid will flow out of the tube and into the atmosphere, leaving less fluid to flow to the fluid-actuated controller and keeping the a control valve responsive to the controller in a closed position. By pivoting the lever in the opposite sense, the blade more nearly approaches the outlet of the tube, thereby restricting the flow of fluid therefrom, providing greater fluid pressure to the controller, causing opening of the control valve.

The present invention can operate in a manner such that the electrical heating elements are under the control of a computer and operate at different times during a respective cycle, such as during the night and the early morning hours. Thus, during the major portion of the nighttime hours, one of the bimetallic elements can be heated by its electrical heating element so as to keep the fluid flow to the controller at a minimum so that the heat supplied to a space is minimal even though the thermostatic switch is set for zero heating or cooling. At a particular time in the early morning hours, the other electrical heating element can be actuated, causing its bimetallic element to change shape in such a way that the blade covering the outlet of the tube more positively covers the outlet, allowing less of the air to escape to the atmosphere and causing most of the air to go to the controller for opening and operating the control valve, thereby supplying heat or cooling energy to heat or cool the space for a given length of time. During the daytime hours, the thermostatic switch can normally be in use with the control system to control the operation of the heating or cooling apparatus while the computer operated heating elements are deenergized and remain so until the evening hours approach once again.

The primary object of the present invention is to provide an improved control system having a control unit which allow a heating or cooling apparatus to operate in several different modes during a certain time period, such as during a 24 hour day, to thereby assure a more efficient operation of the apparatus with a minimum expenditure of energy.

Another object of the present invention is to provide a control device for a control system of the type described wherein the device has heat sensitive elements thereon which are independently controlled so that the device can be used for changing the mode of operation of the control system under the influence of a remote computer or other similar means to thereby permit greater precision in the operation of the control system over long periods of time.

Other objects of this invention will become apparent as the following specification progresses, reference being had to the accompanying drawings for an illustration of the invention.

IN THE DRAWINGS

DETAILED DESCRIPTION OF THE PRESENT INVENTION

Figure 1:
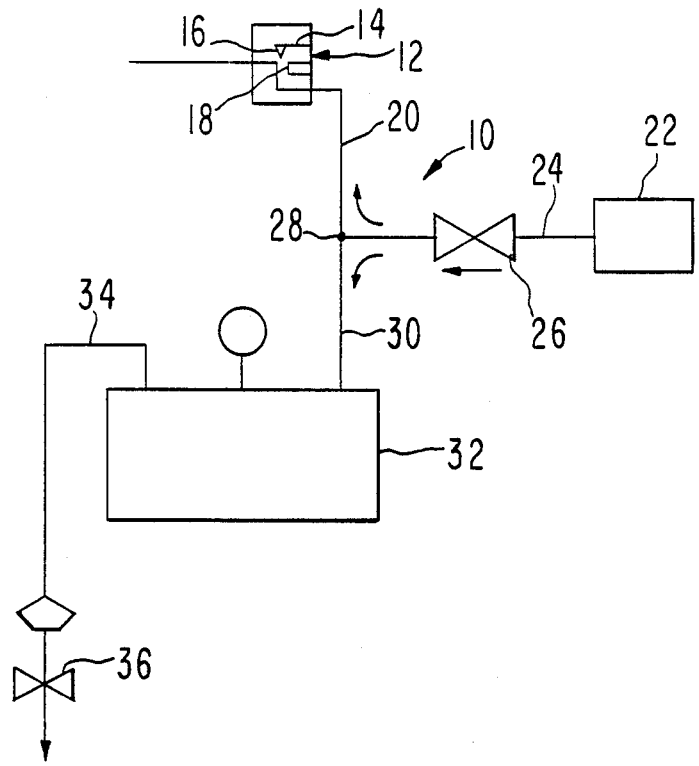
FIG. 1 is a schematic view of a prior art control system for a heating and cooling apparatus of a building or home.

The present invention relates to a heating and cooling system of a building or a home for controlling the heat or cooling of air supplied to a space. A conventional control system of the prior art is shown in FIG. 1 and denoted by the numeral 10. System 10 includes a thermostat 12 mounted on a wall or other suitable location for sensing air temperature. Thermostat 12 includes a bimetallic element 14 which operates a switch or directly moves a valve member 16 for opening and closing an orifice 18, depending upon the temperature of the space surrounding the thermostat. Air from a tube 20 is allowed to pass out of the orifice depending upon the location of the valve member 16. The air emanates from an air pressure source 22 which is coupled by a tube 24 to a fluid flow restrictor 26. The air branches at a location 28 into tube 20 and into a second tube 30 leading to a fluid-actuated controller 32. The output line 34 of controller 32 is directed to a fluid-actuated valve 36 which, for instance, controls the flow of hot water to a heating or cooling coil (not shown) which heats or cools the air in the coil and the heated or cooled air is then blown into the space containing thermostat 12. The condition of valve member 16 with reference to orifice 18 will determine how much air flows into tube 20 and thereby how much air flows into tube 30.

As an example of the operation of system 10, when the temperature drops in the space containing thermostat 12, the valve member 16 is moved away from the orifice, causing more air to flow through tube 20 and out of the orifice into the atmosphere. Correspondingly, less air flows into and through tube 30 and into controller 32. When this occurs, valve 36 is opened and hot or cool water flows into the region for heating or cooling the coil containing the air which is blown into the space for increasing or decreasing the air temperature of the space.

Conversely, when the temperature in the space increases, valve member 16 closes orifice 18 and more air flows through tube 30 into controller 32, thereby creating an additional air flow through tube 34 to valve 36, closing the valve 36 to thereby restrict the hot or cool water flow into the coil for heating or cooling the air in the space.

System 10 as described above is conventional in construction. The present invention improves on system 10 by using a device broadly denoted by the numeral 40 between junction 28 and controller 32. System 10 in FIG. 2 still contains thermostat 12, tube 20, pressure source 22, restrictor 26, controller 32 and valve 36. Device 40 is inserted in line 30 so that the flow of air from source 22 can continue to be influenced by the condition of thermostat 12 yet also be influenced by the operating condition of device 40.

Figure 3:
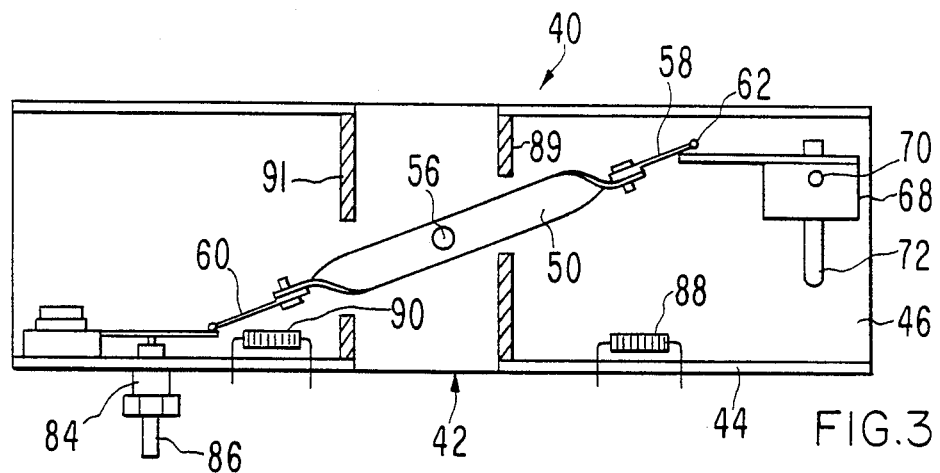
FIG. 3 is a vertical section of a control device for use in the control system of FIG. 2.
Figure 4:
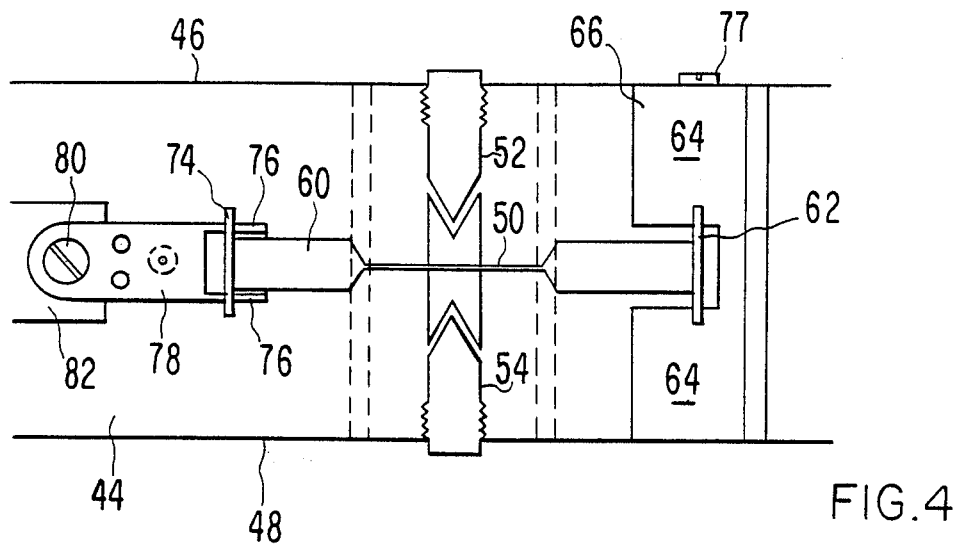
FIG. 4 is a top plan view of the control device of FIG. 3.
Figure 5:
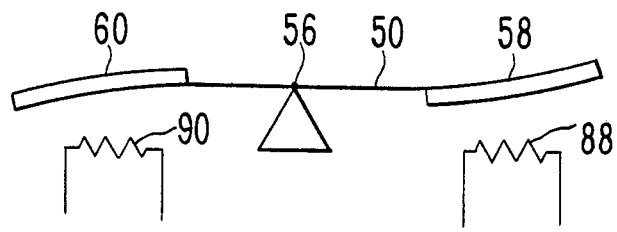
FIG. 5 is a schematic, side elevational view of the lever of the device of FIGS. 3 and 4, showing bimetallic elements at the ends of the lever in proximity to respective heaters.

Device 40 is shown in more detail in FIGS. 3, 4 and 5. Device 40 includes a support 42 which includes a base 44 and a pair of spaced sidewalls 46 and 48. A lever 50 is pivotally mounted by a pair of adjustable pins 52 and 54 on sidewalls 46 and 48 for rotational movement about the common axis 56 of pins 52 and 54. Generally, axis 56 is horizontal but it could be inclined, if desired. Also, base plate 44 is generally horizontal but it could be inclined, if desired.

Lever 50 has a pair of opposed ends provided with bimetallic elements 58 and 60 which project outwardly from the respective ends of the line in a direction away from central axis 56 as shown in FIG. 3. Element 58 has a transversely circular pin 62 (FIGS. 3 and 4) secured thereto and projecting laterally therefrom in opposed directions so that the outer ends of pin 62 can engage the adjacent flat surfaces 64 of a shoulder member 66 secured to a follower member 68 (FIG. 3) adjustably mounted on sidewall 46. Follower member 68 has a screw 70 which passes through a slot 72 in sidewall 76, the screw having a head 77 (FIG. 4) for bearing against the outer surface of wall 46 so that follower member 68 can be adjustable secured in a fixed position along the length of slot 72. This adjustment of follower member 68 presets the angular position of lever 50 about its central axis 56.

Bimetallic element 60 has a transversely circular pin 74 engageable with adjacent flat surfaces of a pair of projecting fingers 76 on a resilient blade 78 secured by a screw 80 to a base 82 rigid in any suitable manner to base plate 44. Blade 78 overlies the open upper end of a tube 84 which projects through base plate 44 and has an outer section 86 which is coupled to controller 32 in a manner hereinafter described with reference to FIGS. 6-8. Blade 78 operates as a valve because it serves to partially or totally block the flow of air out of the adjacent open end of tube 84 for a purpose hereinafter described.

An electrical resistance element 88 is carried by base plate 44 below and in alignment with bimetallic element 58. Thus, when resistance element 88 is electrically actuated, the heat generated therefrom will rise by convection and cause heating of bimetallic element 58 which will change shape as shown in FIG. 5, thereby causing the bias force of blade 78 to pivot lever 50 in a clockwise sense when viewing FIG. 3. This action allows blade 78, due to its resilience, to pivot upwardly in a counter clockwise sense when viewing FIG. 3, thereby further opening the upper adjacent open end of tube 84 and allowing air to escape through the tube into the atmosphere.

A second electrical resistance heater 90 is carried by base plate 44 below and in vertical alignment with bimetallic element 60. When heater element 90 is energized, the heat rises by convection to bimetallic element 60 which assumes the curved position of FIG. 5, forcing blade 78 in a clockwise sense when viewing FIG. 3, tending to further close the open adjacent upper end of tube 84 and further restricting the flow of air through the tube and out of the atmosphere through the open top thereof adjacent to blade 78.

A pair of walls 89 and 91 substantially thermally isolate the spaces containing heater elements 88 and 90 from each other. Each wall has a slot for receiving lever 50 and for allowing the lever to pivot through a limited angle. Thus, the heat from heater element 88 does not affect bimetallic element 60, and the heat from heater element 90 does not affect bimetallic element 58.

Figure 2:
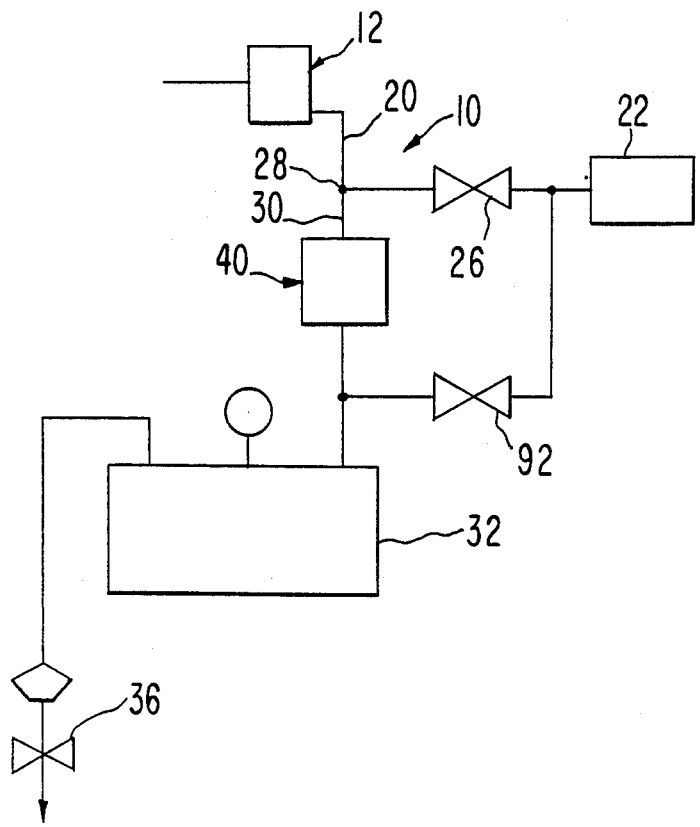
FIG. 2 is a view similar to FIG. 1 but showing an improved control system using the teachings of the present invention.
Figure 6:
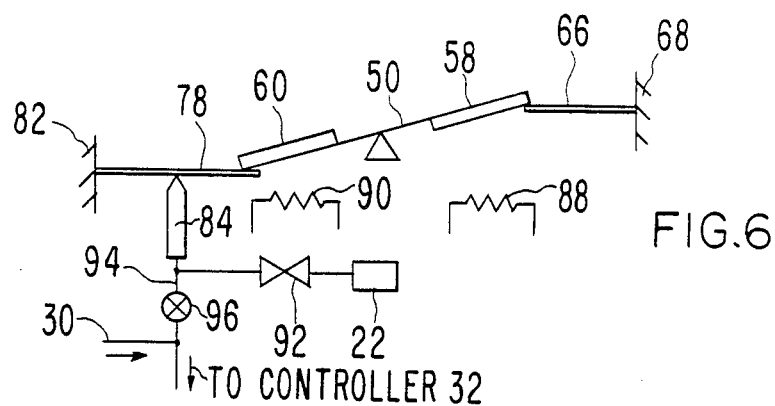
FIG. 6 is a schematic view of the improvement in the control system of FIG. 2, showing the way in which the device of FIGS. 3-5 is coupled to the system.
Figure 7:
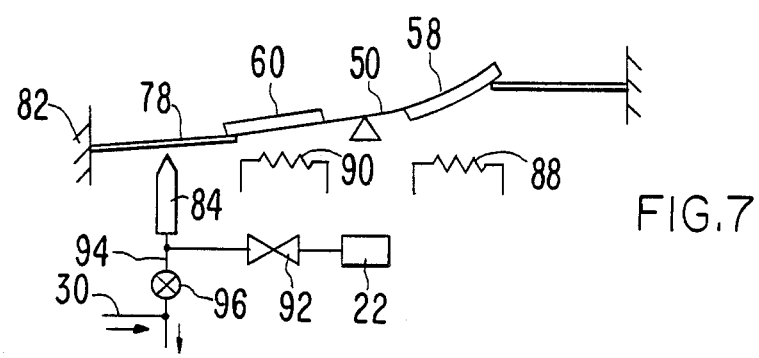
FIGS. 7 and 8 are views similar to FIG. 6 but showing the way in which the device sequentially operates at different times of a day.

Device 10 is coupled to system 10 by coupling tube 84 to pressure source 20 through a restrictor 92 (FIG. 2). Tube 84 has a segment 94 (FIG. 6) provided with a one way check valve 96, and segment 94 is coupled to tube 30 (FIGS. 1 and 6) at a location on the opposite side of one-way check valve 96 from blade 78 as shown in FIG. 6. Thus, air flow through tube 30 cannot enter the upper end of pipe 84 and pass out of the open end thereof which leads to the atmosphere. It can be seen from FIG. 6 that blade 78 overlies the adjacent open end of tube 84 and that pivotal action of lever 50 determines the operative position of blade 78 relative to this open end. Tube 30 leading from junction 28 can still be operable to direct a fraction of the air flow entering junction 28 to controller 32, thereby controlling the operation of valve 36 during periods when device 40 has substantially no influence on the operation of the system.

In operation, a typical sequence is to have a system 40 operated by a computer during nighttime hours and during early morning hours and then to have the conventional system under the influence of thermostat 12 to operate the system during the daytime hours. For instance, a typical arrangement is to have heater elements 88 and 90 coupled to a computer or other apparatus which actuates heater elements 88 and 90 at specific times. A typical sequence is to set heater 88 so that, throughout the nighttime hours, bimetallic element 58 will be in the position shown in FIG. 7, opening the orifice of tube 84 to a maximum amount, causing the air from source 22 flowing into tube 84 to escape to the atmosphere through orifice 98. This will mean that little or substantially no air will flow to controller 32 by way of segment 94 (FIG. 6) and valve 36 will remain closed or only slightly open.

Figure 8:
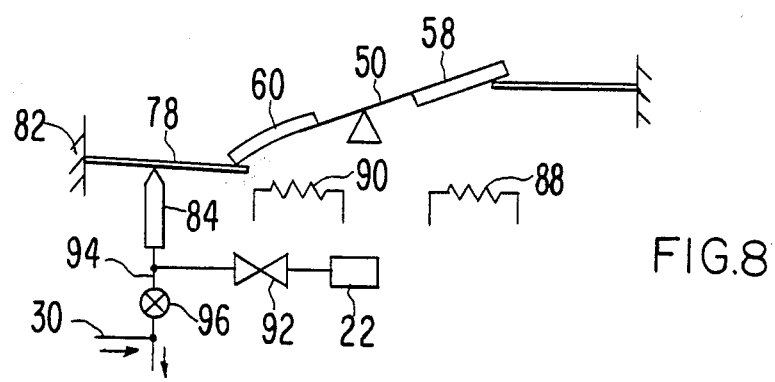

At a certain time in the morning, heater element 88 will be cut off and heater element 90 will be energized, causing bimetallic element 60 to assume the operative position shown in FIG. 8, causing blade 78 to move into closing relationship to the orifice of tube 84, causing air from source 22 to flow through segment 94 to controller 32. This causes an additional air flow to valve 36, opening the valve, and cause heat or cooling energy to heat or cool the space. During daytime hours, thermostat 12 can be used with the computer coupled to either elements 88 and 90 will assure that the heater elements will not be operated during this period of the day.

The present invention provides an improved device for more accurate control of the operation of an airconditioning unit of a building or a home. Moreover, with the device of the present invention, the control system of the airconditioning unit is much greatly improved and the desirable results achieved by the use of the device of the present invention assures energy savings over long periods of time without a large capital expenditure without modifying a basic, conventional control system beyond the addition of the control device of the present invention to the system itself.

I claim:
1. A control system for a heating and cooling apparatus of a building comprising:
a fluid-actuated controller having a fluid inlet and a fluid outlet, the fluid outlet having a first, fluid-actuated valve coupled therewith, the valve being actuated in response to the volume rate of flow of fluid from the controller through the outlet thereof, said valve being adapted to control a fluid operable to provide heating and cooling energy to said apparatus;
a fluid line coupled to the inlet of the controller;
a source of air pressure coupled with the fluid line;
a second, temperature responsive valve coupled with said air pressure source for controlling the volume rate of a first flow of fluid from the source to the inlet of the controller; and
a control device coupled with the temperature responsive valve for controlling the volume rate of flow of a second flow of fluid from the source to the inlet of the controller, said control device including a support, a lever pivotally mounted intermediate its ends on the support for movement about a central axis, a pair of spaced bimetallic elements on the lever on opposite sides of the central axis, and means coupled with each element, respectively, for selectively changing the temperature of the same, said lever being coupled to said second valve, whereby shifting of the lever in said opposed directions causes an increase and decrease, respectively, in the volume rate of flow of fluid controlled by the second valve.

2. A control system as set forth in claim 1, wherein the bimetallic elements are mounted on the lever at the outer ends thereof.

3. A control system as set forth in claim 2, wherein the bimetallic elements extend longitudinally of the lever and project outwardly therefrom at respective outer ends thereof.

4. A control system as set forth in claim 2, wherein said temperature changing means for each bimetallic element includes a source of heat below the corresponding bimetallic elements.

5. A control system as set forth in claim 4, wherein each source of heat includes an electrical resistance heating element adapted to be coupled to a computer.

6. A control system as set forth in claim 1, wherein said fluid line includes a tube having said second valve coupled therewith to control the volume rate of flow of fluid through the tube, one of the bimetallic elements being coupled to the second valve, means biasing the second valve in a predetermined direction, and a fixed stop near the lever, the other bimetallic element being coupled to said fixed stop.

7. A control system as set forth in claim 6, wherein said stop is adjustably mounted on the support.

8. A control system as set forth in claim 7, wherein said second valve comprises a resilient blade, said blade being under compression and biasing the lever in one direction about said axis.

9. A control system as set forth in claim 1, wherein is included wall means substantially isolating the space on one side of the axis of the lever from the space on the opposite side of said axis.

10. A control system as set forth in claim 11, wherein said wall means comprises a pair of spaced walls, each wall having a slot therethrough for shiftably receiving the lever.

11. A control device for a fluid-actuated control system of a heating and cooling apparatus comprising:
a support;
a lever pivotably mounted on the support for rotation about a central axis intermediate the ends of the lever;
a pair of bimetallic elements secured to the lever on opposite sides of said axis;
means on a support for changing the temperature of each bimetallic element, respectively, said changing means for each bimetallic element adapted to be coupled to an actuator for selective actuation thereby;
means on the support for defining a stop engaging one of the bimetallic elements;
means on the support for defining a fluid passage;
a shiftable valve member carried by the support and being operable to open and close said fluid passage, the other bimetallic element being coupled to the valve member, there being a means biasing the valve member in a predetermined direction relative to said tube, whereby the operative positions of the bimetallic element determine the volume rate of flow of fluid through the tube.

12. A control device as set forth in claim 11, wherein the bimetallic elements are adjacent to the ends of the lever.

13. A control device as set forth in claim 11, wherein the bimetallic elements extend longitudinally of and outwardly from respective ends of the lever, each temperature changing means being vertically aligned with a respective bimetallic element.

14. A control device as set forth in claim 11, wherein each temperature changing means comprises an electrical resistance heating element carried by the support below and in vertical alignment with a respective bimetallic element.

15. A control device as set forth in claim 11, wherein said stop is adjustably mounted on the support.

16. A control device as set forth in claim 11, wherein said valve member comprises a resilient blade normally under a bending stress by the other bimetallic element.

17. A control device as set forth in claim 16, wherein an outer portion of said blade forms a spring defining said bias means.

18. A control device as set forth in claim 11, wherein is included wall means for thermally isolating the space near one of the bimetallic elements from the space near the other bimetallic element.

19. A control device as set forth in claim 11, wherein the stop includes means defining a pair of flat surfaces on opposite sides of the adjacent bimetallic element, there being a transversely circular pin on the last-mentioned bimetallic element, said pin being in line contact at its ends with said flat surfaces.

20. A control device as set forth in claim 11, wherein said valve member includes a resilient blade having an outer end slot defining a pair of spaced fingers, each finger having a flat upper surface, the adjacent bimetallic element having an outer end provided with a transversely circular pin thereof, the outer ends of the pin being in line contact with the flat surfaces of the fingers.

* * * * *